United States Patent [19]

Gordon

[11] 4,276,163
[45] Jun. 30, 1981

[54] HYDROSTATIC RELIEF VALVE

[76] Inventor: Leonard Gordon, 18344 Oxnard St. Unit 108, Tarzana, Calif. 91356

[21] Appl. No.: 94,176

[22] Filed: Nov. 13, 1979

[51] Int. Cl.³ .......................................... B01D 35/02
[52] U.S. Cl. .................................. 210/136; 210/169; 210/315; 137/544
[58] Field of Search ................ 210/97, 136, 416 AS, 210/429–432, 315, 169, ; 137/535, 544, 545

[56] References Cited

U.S. PATENT DOCUMENTS

| | | | |
|---|---|---|---|
| 2,495,754 | 1/1950 | Nance | 210/136 X |
| 2,750,047 | 6/1956 | Hasbroock | 210/136 X |
| 3,247,968 | 4/1966 | Miller | 210/136 |
| 3,310,173 | 3/1967 | Sosowea | 210/315 X |
| 3,312,349 | 4/1967 | Rosaen | 210/315 X |
| 3,867,289 | 2/1975 | Ortega | 210/169 X |

Primary Examiner—John Adee
Attorney, Agent, or Firm—Lyon & Lyon

[57] ABSTRACT

Apparatus is disclosed for preventing the buildup of excessive water pressure underneath a water tank, tub or spa which is placed in the ground while at the same time preventing the inflow of waste particles or the outflow of water from the tank, tub or spa. The apparatus includes a pressure sensitive relief valve in combination with a multiple stage filtering system. The filtering system includes a central collection tube wrapped with filter material, around which filtering particles are packed, all of which are enclosed in a filter cage. The valve unit is positioned such that it draws only from the collection tube. Means are provided for securing the assembly to the underside of the water tank.

8 Claims, 4 Drawing Figures

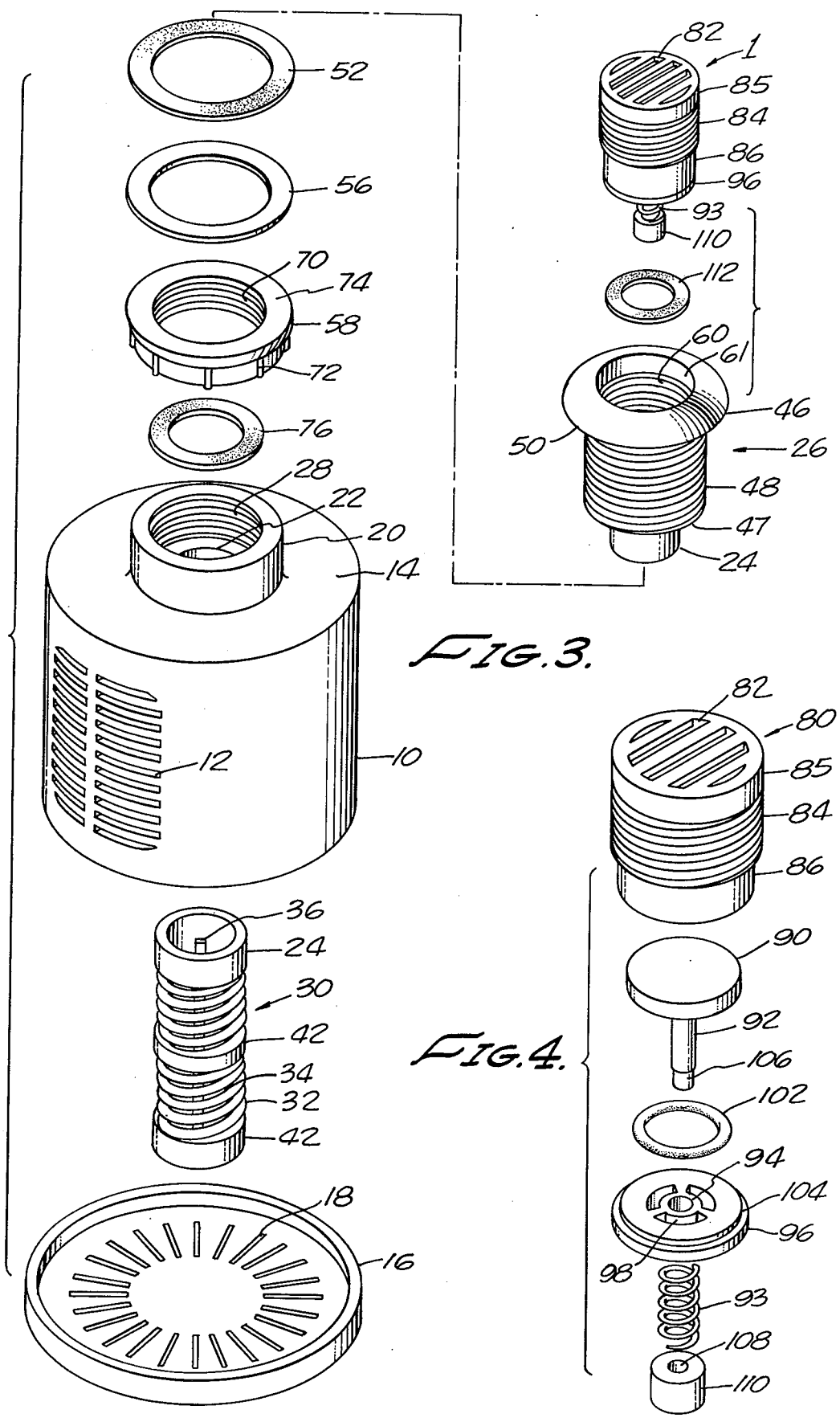

HYDROSTATIC RELIEF VALVE

BACKGROUND OF THE INVENTION

The present invention relates generally to hydrostatic relief valves, and more particularly to hydrostatic relief valves having integral filtering systems for use with tubs or spas which are substantially implanted in the ground.

Tubs or spas which are placed substantially at ground level are usually supported in the ground by placing a layer of sand on the floor of the excavation, on top of which the spa will rest. Although such a procedure provides the necessary support for the spa, it also permits ground water to accumulate beneath the spa. Depending upon the drainage for the particular location, considerable amounts of ground water may accumulate and exert substantial pressures on the spa, which is usually constructed of fiberglass. If the spa is then drained, such as for repairs, a large pressure differential across the spa is created. This pressure differential can cause considerable damage to the spa, including rupturing the spa or its plumbing connections.

Although it has been known to include a check valve in the base of a swimming pool, no such device has been used with hot tubs or spas to relieve excessive pressure differentials which may exist under the above-stated conditions. Those devices which have been used with swimming pools are unsatisfactory for use with hot tubs and spas because they allow waste which has accumulated under the spa to contaminate the spa's interior. In addition, such devices frequently are rendered inoperative because the sand and other particulate matter which accumulates under the spa becomes lodged in the check valve and prevents it from reseating, thereby leaving the interior of the spa in fluid communication with the ground water underneath.

SUMMARY OF INVENTION

The present invention is directed toward a hydrostatic relief valve assembly which overcomes the foregoing and other limitations of the prior art while still providing a simple and reliable means for preventing the existence of excessive pressure differentials across the spa wall.

These objects are provided by a multiple stage filtration means which includes a collection tube which is in fluid communication with the relief valve, a first filter fitted about the collection tube for preventing small particles from penetrating to the relief valve, and a second filter of larger particles for preventing the screen of the first filter from becoming clogged with particles. The assembly is then affixed to the spa such that the filter is suspended beneath the spa, with the valve portion providing fluid communication therethrough to provide reliable protection against excessive differential pressures.

It is therefore one object of the present invention to provide an improved hydrostatic relief valve for use with hot tubs, spas or the like.

It is another object of the present invention to provide an improved relief valve wherein the valve seat is protected from contamination by particulate matter.

Still another object of the present invention is to provide an improved hydrostatic relief valve for use in submerged conditions without clogging.

These and other objects of the present invention may be better appreciated from the following detailed description and claims.

DESCRIPTION OF THE FIGURES

FIG. 3 is an exploded perspective view of the major components of the invention.

FIG. 4 is an exploded perspective view of the components of the valve unit.

PREFERRED EMBODIMENT

Figures 1, 2:
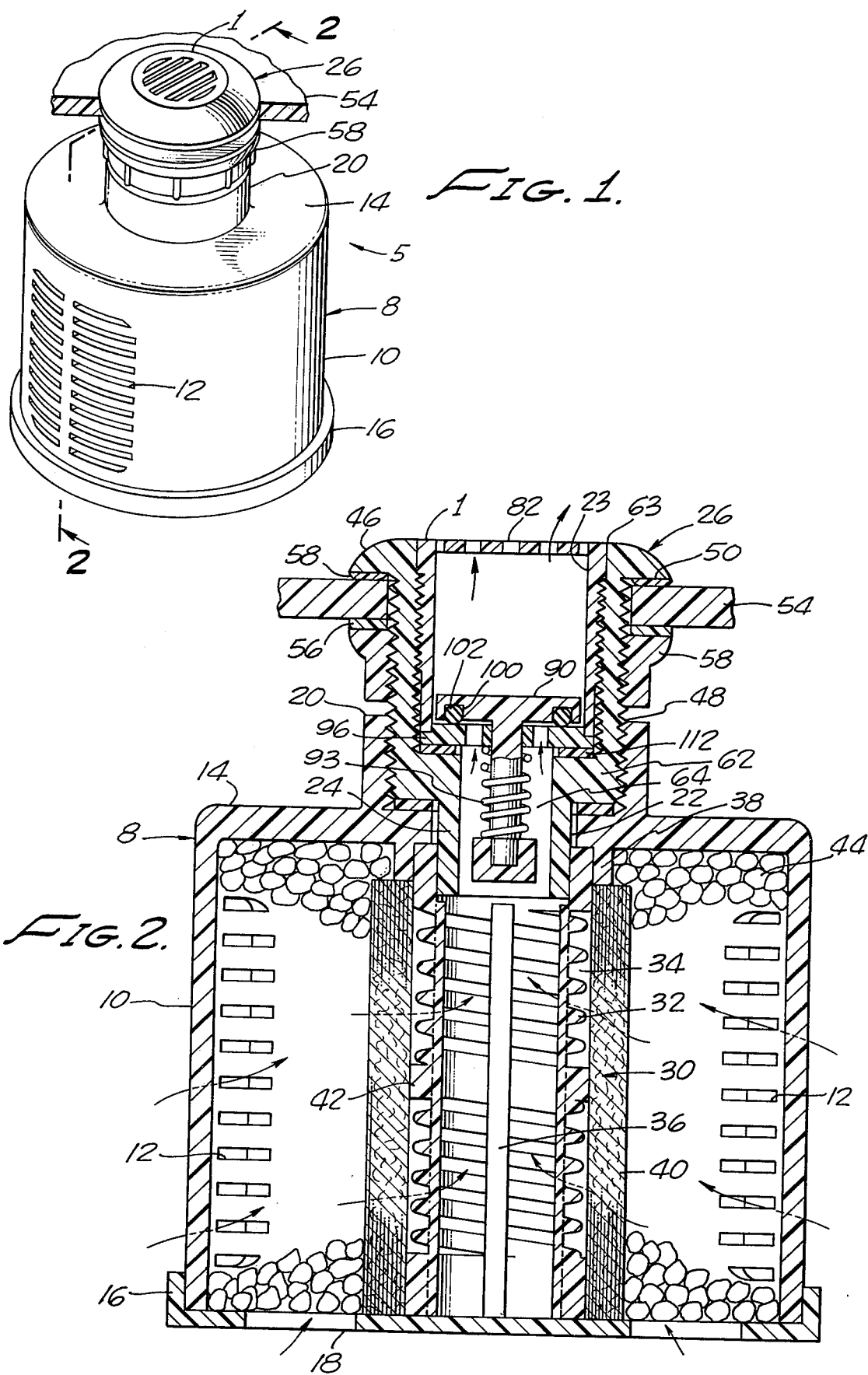
FIG. 1 is a perspective view of the assembled invention.
FIG. 2 is a cross-sectional view of the assembled invention taken along line 2 as shown in FIG. 1.

An exemplary embodiment of the present invention, shown in cross section in FIG. 2, is comprised of a valve assembly 1, together with a filter assembly 5. The filter assembly 5 is comprised of a filter cage, generally designated 8, which includes a cylindrical wall 10 in combination with top portion 14 and a base cover 16.

Wall 10 defines a hollow interior space. Free flow through wall 10 is provided by inlet foramina 12. Filter cage 8 is open at the first end. It is closed at a second end by top portion 14. Base cover 16 snugly slides onto cylindrical wall 10 to enclose the cage 8. Base cover openings 18, as shown in FIG. 2, provide further inlet means to the interior of cage 8. Cage neck 20 protrudes above top portion 14 and encloses a circular aperture 22 (see FIGS. 2 and 3), which extends through top portion 14 into the interior of cage 8. Circular aperture 22 is of a diameter slightly greater than the diameter of insert neck 24 so that insert neck 24 will snugly slide therethrough. The diameter of the space defined by interior surface 28 of cage neck 20 is greater than the diameter of circular aperture 22 thereby allowing a portion of top portion 14 of cage 8 to form a circular ring about the periphery of circular aperture 22 as seen in FIGS. 2 and 3. As seen in FIG. 3, the interior surface 28 of cage neck 20 is threaded.

Turning now to the interior of filter cage 8, a collection tube, generally labeled 30, is shown in FIGS. 2 and 3. The collection tube 30 comprises spiral ribs 32, which ribs are spaced apart such that the tube openings 34 allow free flow of liquid into the collection tube. The spiral ribs 32 are supported by vertical supports 36. The outside diameter of collection tube 30 is such that it snugly adapts to the interior diameter of circular flange 38, which is depended from top portion 14 of filter cage 8. The interior diameter of collection tube 30 is such that it snugly accepts insert neck 24. The vertical supports 36 are sufficiently recessed from the upper portion of collection tube 30 to accommodate therein the insertion of insert neck 24. Fitted immediately about collection tube 30 is a cloth filter 40. The cloth filter extends from the base plate 16 to the circular flange 38, covering all tube openings 34 in collection tube 30. The cloth filter 40 is supported by horizontal circular supports 42 at the ends and middle of collection tube 30. The remainder of filter cage 8, except the interior of collection tube 30, is filled with filtering particles 44.

The insert, generally designated 26 in FIG. 3, is generally formed as a hollow cylinder. Rounded lip 46 is formed about its upper periphery. Insert 26 has a threaded outer surface 48 which extends from the underside 50 of rounded lip 46 to lower end 47 of insert 26. The overall length of the threaded outer surface 48 is equal to the combined thicknesses of rubber washer 52, attaching surface 54, plastic washer 56, nut 58, and the depth of cage neck 20. The threads on threaded interior surface 60 commence at a distance below the upper end of insert 26 such that flat surface 61 is created. The width of flat surface 61 is equal to the width of unthreaded portion 85 on valve guard 80. The interior diameter of flat surface 61 corresponds with the outside diameter of unthreaded portion 85. In this way, when assembled, the interface 63 of insert 26 and valve unit or assembly 1 presents a smooth, flat, uniform surface. (See FIG. 2). The threads on threaded interior surface 60 extend to bottom plate 62. While the upper end of insert 26 is open, the bottom end is partially closed by bottom plate 62. Circular neck 24 encompasses circular opening 64 and protrudes a distance below bottom plate 62.

Nut 58 has interior threaded surface 70. The interior diameter of nut 58 corresponds with outside diameter of threaded outer surface 48 of insert 26. Nut 58 is molded with ribs 72 to provide improved gripping capability. The top surface 74 of nut 58 is flat. As seen in FIG. 2, nut 58 threadably engages insert 26 to attach the assembled invention to attaching surface 54. Rubber washer 52 is placed above surface 54 to form a water tight seal. Plastic washer 56 is placed below attaching surface 54 to relieve stress on surface 54 during attaching operations.

Insert 26 threadably attaches to cage 8, threaded outer surface 48 engaging threaded interior surface 28 of the cage neck 20. Rubber washer 76 provides a water tight seal at the union of insert 26 and top portion 14.

The valve assembly, generally labeled 1, is shown in an exploded view in FIG. 4. The valve guard, generally designated 80 in FIG. 4, is a hollow cylinder closed at its top end. Outlet openings 82 allow a free flow therethrough. The upper outside surface 85 of guard 80 is unthreaded. Its length is equal to that of surface 61 on insert 26. The middle outside surface 84 of guard 80 is threaded. The lower outside surface 86 is of lesser diameter than surfaces 84 and 85 and is not threaded. The outside diameter of valve guard 80 corresponds with the diameter of the threaded interior surface 60 of insert 26. The interior surface 88 of valve guard 80 is uniform and smooth. Its interior diameter is sufficiently greater than the diameter of valve head 90 to allow free flow of liquid therebetween as shown in FIG. 2. Valve head 90 is fixedly attached to valve stem 92. Valve stem 92 is sized to fit slidably into stem guide 94 and extend through and beyond valve seat 96. Valve seat 96 is provided with apertures 98 to allow a free flow of liquid therethrough. Valve head 90 contains a circular groove 100 on its underside into which O-ring 102 is placed. The O-ring creates a water tight seal with valve seat 96 when the valve head 90 is in the closed, or down, position. Once the valve head 90, valve stem 92 and O-ring 102 are assembled and inserted through valve guide 92, valve seat 96 is solvent welded to the underside of valve guide 90. The upper outside edge 104 of valve seat 96 is grooved to adapt to the bottom of valve guard 80 when so assembled. Spring 93 slides onto stem 92. The lower end 106 of valve stem 92 is slightly reduced in diameter in size to snugly fit into concavity 108 of valve stem stop 110. This union is also solvent welded causing spring 93 to be forced against the bottom of valve seat 96, thereby biasing valve head 90 to the closed position. Valve stop 110 has diameter less than the interior diameter of insert neck 24 such that free flow of liquid therebetween is allowed.

The valve assembly 1 is screwed into insert 26, threaded outside surface 84 of the valve unit engaging threaded interior surface 60 of the insert. Rubber washer 112 creates a water tight seal at the interface of valve seat 96 and insert bottom plate 62. The total height of the assembled valve assembly 1 plus the thickness of washer 112 is equal to the height of the hollow space defined by insert 26 from the top of the lip 46 to bottom plate 62 so that when valve unit 80 is screwed into insert 26, the top of valve unit 80 is flush with the top of insert 26.

As assembled above, the invention will normally be attached to the underside of a hot water tank, tub or spa which is placed in the ground. So long as the pressure exerted upon the valve head 90 by the water in the tub or tank and spring 93 exceeds the pressure exerted by accumulated water underneath the tub, valve head 90 will be positioned against valve seat 96 and no flow of water will be permitted. If, however, the pressure underneath the tub exceeds that pressure, the water accumulated under the tub will unseat valve head 90 and will flow into the tank, relieving the differential pressure which might otherwise cause severe damage to the tub. In this preferred embodiment, the valve and spring are adjusted such that a static force of ¾ oz. opens the valve ⅛ inch. The plurality of filtration stages of the present invention ensure that the valve head reliably reseats after the differential pressures have been reduced to an acceptable level.

While embodiments and applications of the invention have been shown and disclosed, it would be apparent to those skilled in the art that many modifications are possible without departing from the inventive concepts herein described. The invention, therefore, is not restricted except by spirit the appended claims.

As assembled above, the invention will normally be attached to the underside of a hot water tank, tub or spa which is placed in the ground. So long as the pressure exerted upon the valve head 90 by the water in the tub or tank and spring 93 exceeds the pressure exerted by accumulated water underneath the tub, valve head 90 will be positioned against valve seat 96 and no flow of water will be permitted. If, however, the pressure underneath the tub exceeds that pressure, the water accumulated under the tub will unseat valve head 90 and will flow into the tank, relieving the differential pressure which might otherwise cause severe damage to the tub. The plurality of filtration stages of the present invention ensure that the valve head reliably reseats after the differential pressures have been reduced to an acceptable level.

While embodiments and applications of the invention have been shown and disclosed, it would be apparent to those skilled in the art that many modifications are possible without departing from the inventive concepts herein described. The invention, therefore, is not restricted except by spirit the appended claims.

What is claimed is:

1. A hydrostatic relief valve assembly for use with hot tubs, spas and the like disposed in the ground, comprising;
   a. a filter cage defining a hollow interior;
   b. a circular aperture in one end of said cage;
   c. an inwardly extending circular flange attached to said cage and located concentrically around said circular aperture;

d. a circular neck attached to and extending above said cage, said neck located concentrically around said circular aperture;

e. a cylindrical insert, attachable to said neck and to the tub or spa floor, having a circular insert neck with an exterior diameter less than that of said circular aperture such that said insert neck may enter said circular aperture, to provide fluid communication between said filter cage and said insert, and further having a spring loaded check valve unit in fluid communication with said insert neck;

f. a substantially porous cylindrical collection tube having an exterior diameter approximately equal to the interior diameter of said circular flange and an interior diameter approximately equal to the exterior diameter of said insert neck, such that the end of said collection tube fits snugly between said circular flange and said insert neck; and g. filtration means substantially surrounding said collection tube.

2. The invention of claim 1 further comprising attachment means for attaching the valve assembly to the floor of the hot tub or spa comprising a rounded lip on said insert which presents a flat surface for abutting the interior of the tub floor, and a threaded nut, threadably adjustable on said insert, for engaging the underside of the tub floor.

3. The invention of claims 1 or 2 wherein said filter means comprise filter cloth of fine mesh immediately about said collection tube, filter particles, of large mesh, within said filter cage around said first filter element and apertures in said filter cage.

4. A hydrostatic relief valve assembly for use with hot tubs, spas and the like disposed in the ground for providing filtered fluid communication between the underside of the spa and the interior of the spa whereby excess water pressure build-up under the spa may be released, via a check valve assembly, which check valve is accessible from the interior of the spa while the remainder of the assembly is displaced in the ground beneath the spa, comprising a foraminous filter cage having a circular aperture in one end thereof, an interiorally extending flange around said aperture and an exteriorally extending neck around said aperture; a threaded, cylindrical insert, defining a hollow interior, having an upper lip designed and constructed to abut the tub or spa floor when the insert is placed through an appropriately sized hole in the tub or spa floor and attachable to said exteriorally extending neck of said filter cage; a cylindrical neck attached to the side of said insert opposite to said lip, which neck has sufficient length to extend through said circular aperture in said filter cage and a distance into the interior of said filter cage when said insert is attached to said filter cage neck; a check valve unit removably attached to said insert and in fluid communication with said insert neck; a porous collection tube designed and constructed to fit snugly around said insert neck and within said inwardly extending flange of said filter cage; and filter means within said filter cage and substantially encompassing said collection tube.

5. The invention of claim 4 wherein said collection tube is a cylinder having a ribbed configuration, which cylinder extends from the circular aperture of said filter cage to the opposing end of said filter cage.

6. The invention of claim 4 wherein said filter means comprises filter cloth wrapped about said collection tube and filter particles in said filter cage.

7. The invention of claim 4 wherein said valve unit is threadably attached to said insert, the size of said valve unit such that when so attached within said insert, a continuous, uniform surface is presented to the interior of the spa.

8. A hydrostatic relief valve assembly for use with hot tubs, spas and the like disposed in the ground, comprising:

(a) a filter cage open at a first end and closed at a second end with a circular aperture centrally located in said closed second end;

(b) a circular flange located concentrically around said circular aperture and having a diameter greater than the diameter of said circular aperture, said circular flange extending inwardly of said closed second end of said filter cage;

(c) a circular neck attached to said closed second end, located concentrically around said circular aperture, and having a diameter greater than the diameter of said circular aperture, said neck extending exteriorally from said filter cage, said neck having interior and exterior threaded surfaces;

(d) a cylindrical insert defining a hollow interior, having a threaded outer surface designed and constructed to engage the interior threaded surface of said neck, a circular insert neck with a diameter less than that of said circular aperture in said closed second end of said filter cage such that said insert neck may enter said circular aperture when said insert is threadably attached to said cage neck, and an interiorally threaded surface;

(e) a valve assembly threadably attached within said insert, said valve assembly having an exteriorally threaded surface for engaging said interiorally threaded surface of said insert, said valve assembly designed and constructwd to provide a smooth and uniform surface with said insert, said valve assembly further having a spring-loaded check valve for precluding the flow of material through the interior of said insert;

(f) attachment means for attaching said insert to the floor of the hot tub or spa, said means comprising a rounded lip on said insert which provides a flat shoulder on the underside thereof for abutting the hot tub or spa floor, and a threaded nut, designed and constructed to be movable along said exteriorally threaded surface of said insert to engage the underside of the hot tub or spa floor;

(g) a cylindrical collection tube having horizontal supports at its ends and middle and a ribbed configuration therebetween, the exterior diameter of said end circular supports being approximately equal to the interior diameter of the circular flange extending inwardly from said closed end of said filter cage, and the interior diameter of said end circular supports being approximately equal to the exterior diameter of said insert neck, such that the end of said collection tube fits snugly between said circular flange and said insert neck;

(h) filter cloth around said collection tube;

(i) filtration particles exteriorally of said filter cloth within said filter cage;

(j) a base cover for enclosing said filter particles, said first filter, and said collection tube within said filter cage; and (k) apertures within said filter cage and said base cover to permit the flow of fluid from outside said filter cage through said filter particles and said first filter, into said collection tube to said check valve.

* * * * *